(12) United States Patent
Huang et al.

(10) Patent No.: US 9,757,898 B2
(45) Date of Patent: Sep. 12, 2017

(54) METHOD FOR LOW TEMPERATURE BONDING OF ELASTOMERS

(71) Applicant: LORD Corporation, Cary, NC (US)

(72) Inventors: Jian-Piang Huang, Cary, NC (US); Ernest B. Troughton, Jr., Raleigh, NC (US); Norah Bate, Apex, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 14/829,244

(22) Filed: Aug. 18, 2015

(65) Prior Publication Data

US 2016/0046111 A1 Feb. 18, 2016

Related U.S. Application Data

(60) Provisional application No. 62/038,605, filed on Aug. 18, 2014.

(51) Int. Cl.
| | |
|---|---|
| *B29C 65/00* | (2006.01) |
| *B32B 37/12* | (2006.01) |
| *B32B 7/12* | (2006.01) |
| *B32B 15/06* | (2006.01) |
| *B32B 25/04* | (2006.01) |
| *B32B 25/12* | (2006.01) |
| *B32B 25/16* | (2006.01) |
| *B29C 65/48* | (2006.01) |
| *C09J 4/00* | (2006.01) |
| *C09J 5/00* | (2006.01) |
| *C09J 133/06* | (2006.01) |
| *B29L 31/00* | (2006.01) |
| *B29K 607/00* | (2006.01) |
| *B29K 705/00* | (2006.01) |

(52) U.S. Cl.
CPC ......... *B29C 66/742* (2013.01); *B29C 65/483* (2013.01); *B29C 65/485* (2013.01); *B29C 66/61* (2013.01); *B29C 66/71* (2013.01); *B32B 7/12* (2013.01); *B32B 15/06* (2013.01); *B32B 25/042* (2013.01); *B32B 25/12* (2013.01); *B32B 25/16* (2013.01); *B32B 37/12* (2013.01); *B32B 37/1284* (2013.01); *C09J 4/00* (2013.01); *C09J 5/00* (2013.01); *C09J 133/06* (2013.01); *B29K 2607/00* (2013.01); *B29K 2611/00* (2013.01); *B29K 2705/00* (2013.01); *B29L 2031/712* (2013.01); *B32B 2037/1253* (2013.01); *B32B 2037/1269* (2013.01); *B32B 2255/10* (2013.01); *B32B 2255/26* (2013.01); *B32B 2311/00* (2013.01); *B32B 2317/22* (2013.01); *B32B 2319/00* (2013.01); *B32B 2439/40* (2013.01)

(58) Field of Classification Search
CPC ..... B65D 90/046; B32B 15/06; B29C 65/485; B29C 66/742
USPC ........................................................ 156/310
See application file for complete search history.

(56) References Cited

U.S. PATENT DOCUMENTS

| | | | |
|---|---|---|---|
| 4,038,454 A | 7/1977 | Lehmann et al. | |
| 4,146,689 A * | 3/1979 | Onizawa | C08K 5/16 525/332.4 |
| 4,221,303 A * | 9/1980 | Yoshimura | B65D 90/045 206/524.2 |
| 4,240,852 A | 12/1980 | Gomberg et al. | |
| 4,432,829 A | 2/1984 | Bachmann | |
| RE31,960 E | 7/1985 | Phillips | |
| 4,687,818 A | 8/1987 | Kawakubo et al. | |
| 4,769,419 A | 9/1988 | Dawdy | |
| 4,855,002 A | 8/1989 | Dunn et al. | |
| 5,011,560 A * | 4/1991 | Nakai | C08G 18/637 156/273.3 |
| 5,059,656 A | 10/1991 | Tsuji | |
| 5,264,525 A * | 11/1993 | Lees | C08L 63/00 252/182.15 |
| 5,476,912 A | 12/1995 | Hosoi et al. | |
| 5,539,070 A | 7/1996 | Zharov et al. | |
| 5,686,544 A | 11/1997 | Pocius | |
| 5,690,780 A | 11/1997 | Zharov et al. | |
| 5,691,065 A | 11/1997 | Zharov et al. | |
| 5,872,197 A | 2/1999 | Deviny | |
| 5,882,799 A | 3/1999 | Roseboom et al. | |
| 5,883,208 A | 3/1999 | Deviny | |
| 5,905,099 A | 5/1999 | Everaerts et al. | |
| 5,912,433 A | 6/1999 | Pulido et al. | |

(Continued)

FOREIGN PATENT DOCUMENTS

| | | |
|---|---|---|
| EP | 0 078 527 | 5/1983 |
| EP | 2 445 975 | 10/2013 |
| SU | 1208045 A * | 1/1986 |
| WO | 95/22567 | 8/1995 |
| WO | 97/07151 | 2/1997 |
| WO | 97/07171 | 2/1997 |
| WO | 97/17383 | 5/1997 |
| WO | 98/17694 | 4/1998 |

(Continued)

OTHER PUBLICATIONS

Database WPI, Week 198636, XP002750518, Thomson Scientific, London GB, Jan. 30, 1986, abstract, 1 pg.

*Primary Examiner* — John Goff
(74) *Attorney, Agent, or Firm* — Todd W. Galinski

(57) ABSTRACT

A method of bonding a vulcanized elastomer is provided comprising the steps of; providing an adhesive comprising a primary acrylate monomer, a reactive flexibilizing monomer, and further optionally comprising a toughener, an adhesion promoter and a free radical initiator, then depositing the adhesive on at least one surface of an elastomer or a second substrate, wherein the elastomer is a vulcanized elastomer, then bringing the elastomer substrate and second substrate together with the adhesive disposed therebetween, and allowing the adhesive to cure and bond the elastomer and second substrate together at a temperature of less than about 100° C. to produce a bonded structure.

11 Claims, No Drawings

(56) References Cited

U.S. PATENT DOCUMENTS

| | | | |
|---|---|---|---|
| 5,935,711 A | 8/1999 | Pocius et al. | |
| 5,990,036 A | 11/1999 | Deviny | |
| 5,994,484 A | 11/1999 | Pocius | |
| 6,008,308 A | 12/1999 | Pocius | |
| 6,012,818 A | 1/2000 | Araki | |
| 6,027,813 A | 2/2000 | Deviny | |
| 6,064,006 A | 5/2000 | Pulido et al. | |
| 6,093,778 A | 7/2000 | Pocius | |
| 6,248,846 B1 | 6/2001 | Zharov et al. | |
| 6,252,023 B1 | 6/2001 | Moren | |
| 6,284,381 B1 | 9/2001 | Zharov et al. | |
| 6,284,976 B1 | 9/2001 | Pulido et al. | |
| 6,287,685 B1 | 9/2001 | Janssen et al. | |
| 6,384,165 B1 | 5/2002 | Moren | |
| 6,479,602 B1 | 11/2002 | Moren | |
| 6,537,659 B2 | 3/2003 | Karim et al. | |
| 6,552,118 B2 | 4/2003 | Fujita et al. | |
| 6,642,298 B2 | 11/2003 | Foreman et al. | |
| 6,706,831 B2 | 3/2004 | Sonnenschein et al. | |
| 6,710,145 B2 | 3/2004 | Sonnenschein et al. | |
| 6,713,578 B2 | 3/2004 | Sonnenschein et al. | |
| 6,713,579 B2 | 3/2004 | Sonnenschein et al. | |
| 6,730,411 B1 * | 5/2004 | Doe | C09J 4/00 428/500 |
| 6,730,759 B2 | 5/2004 | Sonnenschein et al. | |
| 6,740,716 B2 | 5/2004 | Webb et al. | |
| 6,762,260 B2 | 7/2004 | Sonnenschein et al. | |
| 6,777,512 B1 | 8/2004 | Sonnenschein et al. | |
| 6,799,966 B1 | 10/2004 | Horn et al. | |
| 6,806,330 B1 | 10/2004 | Sonnenschein et al. | |
| 6,812,308 B2 | 11/2004 | Deviny et al. | |
| 6,825,298 B2 | 11/2004 | Sonnenschein et al. | |
| 6,849,569 B2 | 2/2005 | Moren | |
| 6,939,932 B2 | 9/2005 | Kneafsey et al. | |
| 6,949,603 B2 | 9/2005 | Sonnenschein et al. | |
| 6,951,909 B2 | 10/2005 | Deviny et al. | |
| 6,964,999 B1 | 11/2005 | Nakagawa et al. | |
| 6,973,949 B1 | 12/2005 | Tokas et al. | |
| 7,025,851 B2 | 4/2006 | Caster et al. | |
| 7,098,279 B2 | 8/2006 | Maandi et al. | |
| 7,151,072 B2 | 12/2006 | Moren | |
| 7,157,399 B2 | 1/2007 | Sonnenschein et al. | |
| 7,185,946 B2 | 3/2007 | Cate et al. | |
| 7,189,303 B2 | 3/2007 | Deviny et al. | |
| 7,235,617 B2 | 6/2007 | Webb et al. | |
| 7,247,596 B2 | 7/2007 | Jialanella et al. | |
| 7,250,091 B2 | 7/2007 | Gupta et al. | |
| 7,291,241 B2 | 11/2007 | Dunlap | |
| 7,401,823 B2 | 7/2008 | Cate et al. | |
| 7,510,623 B2 | 3/2009 | Lutz et al. | |
| 7,524,907 B2 | 4/2009 | Jialanella et al. | |
| 7,534,843 B2 | 5/2009 | Jialanella et al. | |
| 7,638,007 B2 | 12/2009 | Sehanobish et al. | |
| 7,649,068 B2 | 1/2010 | Ahn | |
| 7,666,813 B2 | 2/2010 | Hoefer et al. | |
| 7,683,132 B2 | 3/2010 | Jialanella et al. | |
| 7,732,543 B2 | 6/2010 | Loch et al. | |
| 7,850,870 B2 | 12/2010 | Ahn et al. | |
| 7,887,668 B2 | 2/2011 | Wang et al. | |
| 7,928,174 B2 | 4/2011 | Ahn et al. | |
| 8,067,498 B2 | 11/2011 | Yano et al. | |
| 8,071,220 B2 | 12/2011 | Abraham et al. | |
| 8,097,689 B2 | 1/2012 | Ahn et al. | |
| 8,114,947 B2 | 2/2012 | Jialanella et al. | |
| 8,377,852 B2 | 2/2013 | Ahn et al. | |
| 8,389,444 B2 | 3/2013 | Baecker | |
| 8,501,853 B2 | 8/2013 | Mowrey | |
| 8,501,886 B2 | 8/2013 | Jialanella et al. | |
| 8,530,578 B2 | 9/2013 | Bharti et al. | |
| 8,552,091 B2 | 10/2013 | Barker et al. | |
| 8,580,888 B2 | 11/2013 | Tully et al. | |
| 8,647,716 B2 | 2/2014 | Gutowski et al. | |
| 8,652,578 B2 | 2/2014 | Cranfill et al. | |
| 8,653,183 B2 | 2/2014 | Gutowski et al. | |
| 8,679,585 B2 | 3/2014 | Ahn | |
| 8,734,944 B2 | 5/2014 | Ahn et al. | |
| 8,742,050 B2 | 6/2014 | Wang et al. | |
| 2002/0195453 A1 | 12/2002 | McLeod | |
| 2003/0044553 A1 | 3/2003 | Ramanathan et al. | |
| 2003/0047268 A1 | 3/2003 | Korchnak et al. | |
| 2004/0001945 A1 | 1/2004 | Cate et al. | |
| 2004/0082743 A1 | 4/2004 | Sonnenschein et al. | |
| 2004/0094976 A1 | 5/2004 | Cate et al. | |
| 2004/0238114 A1 | 12/2004 | Lorenzo et al. | |
| 2004/0259990 A1 | 12/2004 | Sonnenschein et al. | |
| 2005/0022923 A1 | 2/2005 | Korchnak et al. | |
| 2005/0035609 A1 | 2/2005 | Cate et al. | |
| 2006/0160943 A1 | 7/2006 | Weir | |
| 2006/0264573 A1 | 11/2006 | Bennett et al. | |
| 2007/0295453 A1 | 12/2007 | Koelman et al. | |
| 2008/0011429 A1 | 1/2008 | Gupta et al. | |
| 2008/0103274 A1 | 5/2008 | Jialanella et al. | |
| 2008/0241637 A1 | 10/2008 | Burdzy | |
| 2009/0068388 A1 | 3/2009 | Tanaka et al. | |
| 2009/0090454 A1 | 4/2009 | Lutz et al. | |
| 2009/0173441 A1 | 7/2009 | Lutz et al. | |
| 2010/0092733 A1 | 4/2010 | Blank et al. | |
| 2010/0266809 A1 | 10/2010 | Schulenburg et al. | |
| 2011/0094656 A1 | 4/2011 | Ferrari et al. | |
| 2011/0104508 A1 | 5/2011 | Wang et al. | |
| 2011/0111219 A1 | 5/2011 | Abe et al. | |
| 2011/0196092 A1 | 8/2011 | Hally et al. | |
| 2012/0070660 A1 | 3/2012 | Miyazaki et al. | |
| 2012/0100378 A1 | 4/2012 | Ohrbom et al. | |
| 2012/0285618 A1 | 11/2012 | Bharti et al. | |
| 2012/0315329 A1 | 12/2012 | Ahn et al. | |
| 2013/0071636 A1 | 3/2013 | Lee et al. | |
| 2013/0129996 A1 | 5/2013 | Ahn et al. | |
| 2013/0140726 A1 | 6/2013 | Ridout et al. | |
| 2013/0178549 A1 | 7/2013 | Ahn et al. | |
| 2013/0178560 A1 | 7/2013 | Hersee et al. | |
| 2013/0267670 A1 | 10/2013 | Xie | |
| 2013/0303702 A1 | 11/2013 | Krayer et al. | |
| 2014/0094566 A1 | 4/2014 | Garbe et al. | |
| 2014/0150647 A1 | 6/2014 | Ahn et al. | |

FOREIGN PATENT DOCUMENTS

| | | |
|---|---|---|
| WO | 98/32207 | 7/1998 |
| WO | 99/64475 | 12/1999 |
| WO | 00/56779 | 9/2000 |
| WO | 01/44311 | 6/2001 |
| WO | 01/68783 | 9/2001 |
| WO | 01/82876 | 11/2001 |
| WO | 02/102646 | 12/2002 |
| WO | 03/018699 | 3/2003 |
| WO | 03/018705 | 3/2003 |
| WO | 03/038006 | 5/2003 |
| WO | 03/041985 | 5/2003 |
| WO | 03/057743 | 7/2003 |
| WO | 03/076485 | 9/2003 |
| WO | 2004/074026 | 9/2004 |
| WO | 2004/074036 | 9/2004 |
| WO | 2004/078871 | 9/2004 |
| WO | 2004/108483 | 12/2004 |
| WO | 2005/000980 | 1/2005 |
| WO | 2005/017005 | 2/2005 |
| WO | 2005/017006 | 2/2005 |
| WO | 2005/063480 | 7/2005 |
| WO | 2005/074060 | 8/2005 |
| WO | 2006/001787 | 1/2006 |
| WO | 2006/049792 | 5/2006 |
| WO | 2006/073695 | 7/2006 |
| WO | 2006/073696 | 7/2006 |
| WO | 2006/088571 | 8/2006 |
| WO | 2007/040794 | 4/2007 |
| WO | 2007/149422 | 12/2007 |
| WO | 2008/027763 | 3/2008 |
| WO | 2008/045921 | 4/2008 |
| WO | 2008/045930 | 4/2008 |
| WO | 2008/084747 | 7/2008 |
| WO | 2008/085234 | 7/2008 |
| WO | 2009/120588 | 10/2009 |
| WO | 2010/014545 | 2/2010 |

(56) References Cited

FOREIGN PATENT DOCUMENTS

| | | |
|---|---|---|
| WO | 2010/021888 | 2/2010 |
| WO | 2010/025086 | 3/2010 |
| WO | 2010/014947 | 12/2010 |
| WO | 2010/149637 | 12/2010 |
| WO | 2010/149733 | 12/2010 |
| WO | 2010/149742 | 12/2010 |
| WO | 2010/149746 | 12/2010 |
| WO | 2011/049919 | 4/2011 |
| WO | 2011/103291 | 8/2011 |
| WO | 2012/051487 | 4/2012 |
| WO | 2012/092142 | 7/2012 |
| WO | 2012/160452 | 11/2012 |
| WO | 2012/177818 | 12/2012 |
| WO | 2013/151680 | 10/2013 |
| WO | 2013/156892 | 10/2013 |
| WO | 2013/162738 | 10/2013 |
| WO | 2014/018761 | 1/2014 |
| WO | 2014/095754 | 6/2014 |
| WO | 2014/099516 | 6/2014 |

* cited by examiner

METHOD FOR LOW TEMPERATURE BONDING OF ELASTOMERS

CROSS REFERENCE TO RELATED APPLICATIONS

The present application claims priority under 35 U.S.C. §119(e) from U.S. Provisional Patent Application Ser. No. 62/038,605 filed Aug. 18, 2014, entitled "Adhesives for Low-Temperature Bonding of Vulcanized Elastomers", the disclosure of which is incorporated herein by reference.

FIELD OF THE INVENTION

The present invention relates to curable adhesive compositions and method of bonding post-vulcanized elastomers. More particularly, the invention relates to adhesives useful for bonding post-vulcanized elastomers, such as rubber, to itself, other elastomers, or to metallic or rigid substrates, preferably without the addition of heat or pressure.

BACKGROUND OF THE INVENTION

There has long existed a need for a robust adhesive and method for bonding vulcanized rubber or other cured elastomers to metal and other substrates. In most rubber bonding processes, a traditional rubber-to-substrate adhesive, such as Chemlok® adhesives sold by LORD Corporation, is applied to a metal part, which is then loaded into a mold and unvulcanized rubber or other elastomer is injected into the mold. The rubber filled mold is then heated to co-cure the adhesive during vulcanization of the rubber. This ensures a robust bond between the rubber and metal substrates.

There are, however, applications where co-curing an adhesive with the rubber is impractical or impossible. For example, during tank-lining applications large sheets of elastomer are bonded to the inside of a rail car or other large industrial tank and the inside surface of the large tank or rail car must be heated and pressurized to bond and vulcanize the rubber. This requires the entire tank to be heated and pressurized for a period of time to complete the curing/bonding processes. It would be preferable to cure the elastomer prior to the lining operation, then bond the cured elastomer to the interior of the tank without any externally applied heat or pressure. In other circumstances, post-vulcanization rubber-to-substrate bonding can provide significant cost advantages compared to in-mold bonding of smaller parts. In all of these instances, it is desirable to form a rubber-tearing bond between the vulcanized rubber and a rigid substrate such as metal.

Prior art solutions to post-vulcanization elastomer-to-metal bonding tend to be tailored to specific industry needs. For example, in the tank lining industry where metallic tanks are lined with rubber or other elastomers there is a recognized industry standard. This process involves surface treatment of the elastomer and metal to "roughen" the substrates, then a coat of solvent-based primer and adhesive on the metal, as well as one or two solvent-based adhesive coats on the elastomer side with drying steps in-between each coating. Then the coated substrates are brought into contact and cured sometimes under heat and pressure. This entire process is time consuming and involves the use of solvent-based and halogen and isocyanate containing materials.

It is therefore desirable to provide materials and a method for post-vulcanization bonding of elastomers, such as natural rubber, to another substrate such as the same or different elastomer (either vulcanized or unvulcanized), and non-elastomeric substrates such as steel and engineered polymers.

It is to these perceived needs that the present invention is directed.

SUMARY OF THE INVENTION

In a first embodiment of the present invention, a method of bonding a vulcanized elastomer is provided comprising the steps of; providing an adhesive comprising a primary acrylate monomer, a reactive flexibilizing monomer, and further optionally comprising a toughener, an adhesion promoter and a free radical initiator, then depositing the adhesive on at least one surface of an elastomer or a second substrate, wherein the elastomer is a vulcanized elastomer, then bringing the elastomer substrate and second substrate together with the adhesive disposed therebetween, and allowing the adhesive to cure and bond the elastomer and second substrate together at a temperature of less than about 100° C. to produce a bonded structure.

In one preferred embodiment of the present invention, the cure step is performed at a temperature of less than about 50° C. In another embodiment of the present invention, the second substrate comprises at least one of an elastomer substrate, a thermoplastic substrate, or a metallic substrate.

In an additional embodiment of the present invention, the primary acrylate monomer comprises at least one of tetrahydrofurfuryl methacrylate or methyl methacrylate. In yet another embodiment of the present invention, the reactive flexibilizing monomer comprises at least one of 2-ethylhexyl methacrylate, hexyl methacrylate, or octyl methacrylate.

In one embodiment of the present invention, the adhesive used further comprises a substrate dependent reactive monomer, which in a preferred embodiment comprises iso-butyl methacrylate. In an additional embodiment of the present invention, the toughener comprises at least one of poly(styrene:butadiene:styrene), poly(styrene:acrylonitrile:butadiene), or styrene:isoprene:styrene. In yet another embodiment of the present invention, the adhesive further comprises an epoxy resin.

In a preferred embodiment of the present invention, the method of bonding employs an adhesive that is free of halogenated compounds, isocyanate compounds, or solvents. In further preferred embodiments of the present invention, the method is carried out without an elastomer chlorination step and/or a metal degreasing step. In fact, in a most preferred embodiment of the present invention, the adhesive comprises the sole chemical composition applied to either the elastomer or second substrate prior to bonding the bonded substrate is absent any metal primer, tack coating, or elastomer pre-treatment.

In another embodiment of the present invention, the adhesive is provided as a 2-part adhesive with the monomers in a first part and the initiator in a second part, and the adhesive is mixed immediately prior to the step of depositing the adhesive. In a further embodiment of the present invention, the adhesive is deposited by providing the primary acrylate monomer on one of the two substrates and providing the initiator on the other substrate, wherein when the two substrates are brought together the initiator cures the acrylate monomer.

In another embodiment of the present invention, the cured adhesive has an adhesion as measured by pull value of greater than 25 pli and preferably greater than 50 pli as measured by ASTM D429 Method D at a peel rate of 2.0 in/min.

In a preferred embodiment of the present invention, the adhesive is provided in two parts, and a first part comprises; 30 to 60 weight percent primary acrylate monomer comprising at least one of methyl methacrylate or tetrahydrofurfural methacrylate, 5 to 15 weight percent reactive flexibilizing monomer comprising at least one of 2-ethylhexyl methacrylate, hexyl methacrylate, or actyl methacrylate, 5 to 15 weight percent of a substrate dependent reactive monomer comprising iso-butyl methacrylate, 10 to 30 weight percent of a toughener, and 0.5 to 5 weight percent of a reducing agent, and a second part comprises; 30 to 60 weight percent of an epoxy resin, and 20 to 40 weight percent of an organic peroxide.

In yet another embodiment of the present invention, a method for lining a tank is provided comprising; providing a metallic tank, providing a cured (vulcanized) elastomeric lining material, depositing an adhesive to at least one of the lining material or the tank, wherein the adhesive comprises an acrylic adhesive, positioning the lining material upon an interior portion of the tank such that the adhesive is disposed therebetween, and allowing the adhesive to cure and bond the lining material to the tank.

As will be realized by those of skill in the art, many different embodiments of a method for low-temperature bonding of vulcanized elastomers according to the present invention are possible. Additional uses, objects, advantages, and novel features of the invention are set forth in the detailed description that follows and will become more apparent to those skilled in the art upon examination of the following or by practice of the invention.

Thus, there has been outlined, rather broadly, the more important features of the invention in order that the detailed description that follows may be better understood and in order that the present contribution to the art may be better appreciated. There are, obviously, additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and of being practiced and carried out in various ways.

It is also to be understood that the phraseology and terminology herein are for the purposes of description and should not be regarded as limiting in any respect. Those skilled in the art will appreciate the concepts upon which this disclosure is based and that it may readily be utilized as the basis for designating other structures, methods and systems for carrying out the several purposes of this development. It is important that the claims be regarded as including such equivalent constructions insofar as they do not depart from the spirit and scope of the present invention.

DETAILED DESCRIPTION OF THE INVENTION

In a first embodiment of the present invention, a method of bonding a vulcanized elastomer is provided comprising the steps of; providing an adhesive comprising a primary acrylate monomer, a reactive flexibilizing monomer, and further optionally comprising a toughener, an adhesion promoter and a free radical initiator, then depositing the adhesive on at least one surface of an elastomer or a second substrate, wherein the elastomer is a vulcanized elastomer, then bringing the elastomer substrate and second substrate together with the adhesive disposed therebetween, and allowing the adhesive to cure and bond the elastomer and second substrate together at a temperature of less than about 100° C. to produce a bonded structure. This method allows for bonding vulcanized elastomers to other substrates at low, preferably near room, temperatures without the use of multilayered adhesives or adhesives with undesirable compounds such as halogens, isocyanates, solvents, and the like.

In a first aspect of the present invention, a primary acrylate monomer is provided comprising at least one free radical-polymerizable monomer in a major amount of the composition. Representative monomers include esters of (meth)acrylic add such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate (THFMA). The preferred monomer(s) contributes rigidity in the cured polymer and is selected from methacrylic esters exhibiting a homopolymer Tg of at least 50° C., preferably 60° C., and some as much as 105° C. In a preferred embodiment of the present invent, the acrylate monomer comprises at least 50 weight percent tetrahydrofurfuryl methacrylate and a minority amount of methylmethacrylate.

In an embodiment of the present invention, the primary acrylate monomer is present in the composition in an amount of between about 10 and about 90 weight percent, more preferably between about 30 and about 70 weight percent, and most preferably between about 40 and about 60 weight percent, based on the total weight of the composition.

In a further embodiment of the present invention a reactive flexibilizing monomer is provided. The reactive flexibilizing monomer is reactive with the primary acrylate monomer and provides flexibility to the backbone of the resulting acrylic polymer. In one embodiment of the present invention, the reactive flexibilizing monomer comprises an acrylate comprising an olefinic group having at least 6 carbon atoms. This olefininc group provides the desired flexibility while the acrylate moiety allows for compatibility with the primary acrylate monomer. In one embodiment of the present invention, the reactive flexibilizing monomer can be represented by the formula $H_2C=CHCO_2R$, where R is a linear or branched hydrocarbon chain and the homopolymer has a $Tg<0°$ C. In a preferred embodiment of the present invention, the reactive flexibilizing monomer comprises at least one of hexyl methacrylate, 2-ethylhexyl methacrylate, octyl methacrylate, or dodecyl (lauryl) methacrylate.

In an embodiment of the present invention, the reactive flexibilizing monomer is present in the composition in an amount of between about 0 and about 50 weight percent, more preferably between about 5 and about 25 weight percent, and most preferably between about 10 and about 15 weight percent, based on the total weight of the composition.

In a further embodiment of the present invention, a substrate dependent reactive monomer is optionally provided. It is believed that an acrylate monomer that is substantially compatible with an elastomeric substrate aids in forming a robust bond with the substrate. For example, in an embodiment wherein the substrate comprises natural rubber, a substrate dependent reactive monomer comprising isobutylmethacrylate substantially improves bonding to the natural rubber. The substrate dependent reactive monomer is selected such that its Hildebrand solubility parameter is compatible with the Hildebrand solubility parameter of the elastomeric substrate. In particular, it is chosen in such a way that its solubility parameter does not differ by more than 10% from the Hildebrand solubility parameter of the elastomeric substrate.

The Hildebrand solubility parameter is well known and calculated by the square root of the cohesive energy density of the compound. The Hildebrand solubility parameter is directly related to the dispersion forces (Van der Waals forces) that are exerted between the molecules of a chemical substance. In particular, the Hildebrand solubility parameter is generally expressed in $cal^{1/2}cm^{-3/2}$.

Another method for determining compatibility is through a swell test. A selection of monomers is chosen to cover a wide range of Hildebrand solubility parameters. For each selected monomer, a rectangular piece of rubber of mass ~2g is weighed and then submerged in monomer. The rubber is allowed to soak in the monomer for 24 hours with mass being measured beginning at 1 hour and then at regular intervals up to 24 hours. Those monomers which swell the rubber to the greatest extent on a per mole monomer basis are judged to be most compatible with the elastomeric substrate. These are then tested as candidates for the compatibilizing monomer within the adhesive formulation.

In an embodiment of the present invention, the substrate dependent reactive monomer is present in the composition in an amount of between about 0 and about 50 weight percent, more preferably between about 0 and about 25 weight percent, and most preferably between about 0 and about 10 weight percent, based on the total weight of the composition.

In one embodiment of the present invention, the adhesive composition further comprises a toughener. The toughener improves impact resistance of the cured adhesive and provides flexibility to reduce cohesive failure of the adhesive. The toughener examples include various solid and liquid elastomeric polymeric materials, and in particular liquid olefinic-terminated elastomers as described in U.S. Pat. Nos. 4,223,115; 4,452,944 4,769,419; 5,641,834 and 5,710,235, the entire disclosure of each which is hereby incorporated by reference.

A-B-A or A-B-C triblock block copolymers are useful tougheners. In one example the A block is polystyrene, alpha-methyl styrene, t-butyl styrene, or other ring alkylated styrenes as well as mixtures of some or all of the above and the B block is an elastomeric segment having a Tg of 0° C. or less, such as that derived from a conjugated diene; isobutylene or other olefin, like ethylene-propylene monomer, and the C block, if present, is acrylonitrile.

In one embodiment of the present invention, a preferred toughener comprises a terblock polymer of styrene-butadiene-styrene with a polystyrene content of about 23% by weight. In another preferred embodiment of the present invention, a preferred toughener comprises styrene-butadiene-acrylonitrile, In another embodiment of the present invention, other high molecular weight tougheners include, for example, block copolymers and random copolymers including but not limited to polyethylene, polypropylene, styrene-butadiene, polychloroprene, EPDM, chlorinated rubber, butyl rubber, styrene/butadiene/acrylonitrile rubber and chlorosulfonated polyethylene.

In another embodiment of the present invention an auxiliary toughener is provided. Preferred auxiliary tougheners comprise urethane modified olefinic -terminated liquid elastomers include those disclosed in U.S. Pat. No. 4,769,419 comprising the reaction product of an olefinic monoepoxide compound with a polycarboxylic homopolymer of conjugated dienes, and most specifically, the glycidyl methacrylate/carboxyl terminated butadiene (GMA/CTB) adduct as described in U.S. Pat. No. 4,769,419, Example 1.

In an embodiment of the present invention, the combined tougheners are present in the composition in an amount of between about 0 and about 50 weight percent, more preferably between about 10 and about 30 weight percent, and most preferably between about 20 and about 30 weight percent, based on the total weight of the composition.

In a further embodiment of the present invention, an adhesion promoter is provided to enhance the adhesion between the adhesive and metallic substrate. Adhesion promoters useful herein are the known phosphorus-containing compounds with mono-esters of phosphinic, mono- and diesters of phosphonic and phosphoric acids having one unit of vinyl or aliylic unsaturation present. Vinylic unsaturation is preferred. Representative of the phoshorus-containing adhesion promoters are, without limitation, phosphoric acid; 2-methacryloyloxyethyl phosphate; bis-(2-methacryloyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; (α-hydroxybutene-2 phosphonic acid; 1-hydroxy-1-phenylmethane-1,1-diphosphonic acid; 1-hydroxy-1-methyl-1-disphosphonic acid; 1-amino-1-phenyl-1,1-diphosphonic acid; 3-amino-3-hydroxypropane-1,1-disphosphonic acid; amino-tris(methylenephosphonic acid); gamma-amino-propylphosphonic acid; gamma-glycidoxy-propylphosphonic acid; phosphoric acid-mono-2-amino-ethyl ester; allyl phosphonic acid; allyl phosphinic acid; β-methacryloyloxyethyl phosphinic acid; diallylphosphinic acid; β-methacryloyloxyethyl)phosphinic acid and allyl methacryloyloxyethyl phosphinic acid. A preferred adhesion promoter: is 2-hydroxyethylmethacrylate phosphate.

Further adhesion promoters useful herein are the known alkenyl functional silanes, having an unsaturated organic moiety bonded to the silicone atom, for example an unsaturated acrylic, vinyl, allyl, methallyl, propenyl, hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl or styryl groups. Other alkenyl functional organometallics include titanates, such as vinylalkyl titanates, zirconates, zinc diacrylate, and zinc dimethacrylates.

Additionally carboxylic acids are good adhesion promoters, including methacrylic acid, itaconic acid, maleic acid, formic acid, mono-2-(methacryloyloxy)ethylsuccinate.

In an embodiment of the present invention, the adhesion promoter is present in the composition in an amount of between about 0 and about 20 weight percent, more preferably between about 0 and about 10 weight percent, and most preferably between about 0 and about 5 weight percent, based on the total weight of the composition.

In an additional embodiment of the present invention, a free-radical cure system is employed to cure the adhesive. A preferred system comprises known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive.

Substantially any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride.

Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), dimethyl aniline, p-halogenated aniline derivatives and dimethyl-p-toluidine; and amineal-dehyde condensation products, for example, the condensation products of aliphatic aldehydes such as butyraldehyde with primary amines such as aniline or butylamine. The use of known accelerators and promoters with the redox couple catalyst systems can be advantageous.

In a further embodiment of the present invention, the acrylic adhesive composition comprises a co-accelerator. The co-accelerator will not cure the acrylic adhesive by itself but serves to increase the rate at which the redox system cures the adhesive. In a preferred embodiment of the present invention, the co-accelerator comprises a bicyclic diaza compound wherein the nitrogen atoms are present in the rings. In a most preferred embodiment of the present invention, the co-accelerator comprises 1,4-diazabicyclo [2.2.2]octane. In a further embodiment of the present invention, the co-accelerator comprises dimethylpiperazine. In an embodiment of the present invention, the co-accelerator is present in an amount from 0.10 to 3.0 weight percent based on the total weight of the composition.

Preferably, the oxidizing agent will be present in an amount in the range from about 1.0 to about 20, preferably about 5.0 to about 10 percent by weight of the adhesive composition, with the amount of reducing agent being in the range from about 0.1 to about 20, preferably about 1.0 to about 10 percent by weight of the adhesive composition. DIIPT is the most preferred reducing agent. The most preferred oxidizing agent is benzoyl peroxide.

In an additional embodiment of the present invention, the free-radical cure system comprises an initiator such as a triethylborane-hexamethylenediamine complex.

In a further embodiment of the present invention, the adhesive comprises an epoxy compound. Epoxy compounds are thought to provide post-bake resistance and an acid-scavenging functionality to prevent acid formed in the cure reaction from reacting with the metallic substrate. The epoxy compound of embodiments of the present invention comprises any material that contains an epoxy (oxirane) group. Included epoxy resins are epoxy cresol novolacs, epoxy phenol novolacs and blends of either of these with bisphenol A epoxy resins. Monomeric epoxy compounds and epoxides of the polymeric type can be aliphatic, cycloaliphatic, aromatic or heterocyclic.

Epoxy resins based on bisphenol A, either solids, and capable of dissolution in a carrier, or liquid, are preferred as these are relatively inexpensive. There are a myriad of available epoxy materials, collectively referred to as epoxy resins whether resinous or simple compounds. In particular, simple epoxy compounds which are readily available include octadecylene oxide, glycidylmethacrylate, diglycidyl ether of bisphenol A.

In an embodiment of the present invention comprising an epoxy resin, the epoxy resin is present at no more than about 20 weight percent, based on the final weight of the adhesive formulation. In a preferred embodiment of the present invention, the epoxy resin is present in an amount of no more than about 15 weight percent, and in a most preferred embodiment of the present invention, the epoxy resin is present from about 2.5 to about 10 weight percent, based on the total weight of the adhesive formulation.

Other optional additives which are typically considered in fully formulated adhesives include antioxidants, inhibitors, anti-sag additives, thixotropes, processing aids, waxes, UV stabilizers, arc suppressants, and drip suppressants. Examples of typical additives are silicas, fumed silica, zirconium silicate, alumina, hindered phenols, substituted hydroquinone, silane-treated talc, mica, feldspar, and wollastonite.

Although the adhesive of the present invention may take many forms, the most preferred adhesive systems are provided as multipack or two-part adhesive systems where one package or part contains the free radical-polymerizable monomer component and the reducing agent and a second part or package contains the oxidizing agent. The two parts are mixed together at the time of use in order to initiate the reactive cure. After mixing the individual parts, one or both surfaces to be joined are coated with the mixed adhesive system and the surfaces are placed in contact with each other. Typical mixing ratios range from 1:1, to 4:1, to 10:1 with the acrylic monomers typically in the "A" side and oxidizing agents in the "B" side with other components balanced between the two.

In one embodiment of the resent invention, the adhesive is provided in a two-part system with a first part comprising 30 to 60 weight percent of a primary acrylate monomer, 5 to 15 weight percent of a reactive flexibilizing monomer, 5 to 15 weight percent of a substrate dependent reactive monomer, 10 to 30 weight percent of a toughener, and 0.5 to 5 weight percent of a reducing agent, all based on the total weight of the first part. Similarly, the second part comprises 30 to 60 weight percent of an epoxy resin and 20 to 40 weight percent of an organic peroxide, all based on the weight of the second side. In a further preferred embodiment of the present invention, both sides optionally comprise fillers and additives.

The adhesives described in the embodiments of the present invention are useful in a number of elastomer to metal bonding applications. In a preferred embodiment of the present invention the adhesives are employed in a low-temperature bonding application of post-vulcanized rubber. "Low-temperature" refers to bonding without the application of external pressure or heat such as in an autoclave or through induction. In one embodiment of the present invention, this bonding operation takes place at a temperature of less than about 100° C. In a preferred embodiment of the present invention, the bonding process takes place at ambient conditions of less than about 70° C., and most preferably less than about 50° C.

In one embodiment of the present invention, some elastomer formulations (commonly natural rubber) have additives such as free-radical inhibitors, waxes, and other compounds which can interfere with bonding. For these elastomers, a solvent wipe is often employed to remove any of these materials that have migrated to the surface of the rubber. Prior to bonding, a rag is moistened with applicable solvent (i.e. IPA, heptanes, etc) and used to wipe the elastomer surface several times to remove impurities. The bonding surface is then allowed to dry completely (5-10 minutes) before mating the pieces together.

In another embodiment of the present invention, the adhesive is deposited on at least one surface of a vulcanized elastomeric substrate or a second substrate, and then the elastomeric substrate is brought into contact with the second substrate such that the adhesive is disposed there between. The adhesive is then allowed to cure thereby bonding the vulcanized substrate to the second substrate. In a preferred embodiment of the present invention the second substrate comprises a metallic substrate. In another preferred embodiment of the present invention, the elastomeric substrate comprises a rubber for use in tank lining applications.

EXAMPLES

In a first example, the following formulation was prepared to demonstrate the effectiveness of employing an acrylic-based adhesive to bond vulcanized rubber at or near room temperature.

A-Side:

| Functional Role | Constituent | Weight Percent |
|---|---|---|
| Primary Acrylate Monomer(s) | MMA | 44 |
| Reactive Flexibilizing Monomer | (see below) | 12 |
| Substrate Dependent Monomer | (see below) | 10 |
| Rubbery Toughener | Core/Shell and GMA/CTB | 23 |
| Reducing Agent | DIIPT | 0.7 |
| Additives | various | 8.3 |

B-Side:

| Functional Role | Constituent | Weight Percent |
|---|---|---|
| Initiator | 57% di-benzoyl peroxide in surfactant | 50 |
| Epoxy resin | Bisphenol-A Epoxy | 45 |
| Thickeners and pigments | TiO2 and Fumed silica | 5 |

Adhesive samples were prepared according to ASTM 429D method for testing rubber to metal bonded samples in pull mode. Blasted CRS steel substrates were taped off to give a 1×1 inch bonding area. Adhesive was applied using a mixing cartridge (10:1 volume ratio) equipped with a mixer tip to the bonding area. 10 mil glass bead were applied to the wet adhesive and the elastomer (1×4 inch, ¼ inch thick) was then pressed on to the adhesive bead to give a 1×1 inch bonded area ~10 mil in thickness. The bonded samples were allowed to cure at ~20-25° C. overnight (~10-15 hrs).

The samples were then pulled at 2.0 in/min at an angle of 90 degrees for elastomer-to-metal bonded samples, and 180 degrees for elastomer-to-elastomer bonded samples. The maximum value of force was recorded as the value of strength (pli) and the amount of rubber retention (% R-R) was recorded as percentage of the disbonded 1×1 inch area. Peel strength defining a "successful" adhesive is typically defined as a strength at which the elastomer begins to tear apart rather than the adhesive delaminating. While peel strength values will therefore vary depending upon the internal strength of the elastomer, a "successful" bond will typically exhibit at least 15-20 pli for a soft elastomer such as unfilled natural rubber, however more preferably peel values comprise 25 pli to 50 pli. Further, adhesives are typically judged to be sufficient if the bond holds past the breaking point of the elastomer and therefore the percent rubber retention is the more important measure with 100% being the goal and indicating a robust adhesive bond.

The following table provides the result of peel tests of an adhesive according to the above-formulation wherein the primary acrylic monomer comprises methyl methacrylate, and the reactive flexibilizing monomer comprises the constituent listed in the table. The mix of reactive flexibilizing monomers was varied to include hexyl methacrylate, octyl methacrylate, lauryl methacrylate, and 2-ethylhexyl methacrylate. Additionally, in some formulations the optional substrate dependent monomer isobutyl methacrylate was added to the formulation.

| Rubber Type | Monomer Mix | Maximum Peel Force (lbs) | % R-R |
|---|---|---|---|
| Natural Rubber | MMA, 2-EHMA, Iso-BMA | 35 | 2% |
| Natural Rubber | MMA, 2-EHMA | 28 | 2% |
| Natural Rubber | MMA, Iso-BMA | 30 | 0% |
| Natural Rubber | MMA, Hexyl MA | 33 | 0% |
| Natural Rubber | MMA, Octyl MA | 28 | 0% |
| Natural Rubber | MMA, Lauryl MA | 39 | 5% |
| EPDM | MMA, 2-EHMA, Iso-BMA | 80 | 80% |
| EPDM | MMA, 2-EHMA | 70 | 90% |
| EPDM | MMA, Iso-BMA | 72 | 100% |
| EPDM | MMA, Hexyl MA | 65 | 67% |
| EPDM | MMA, Octyl MA | 64 | 87% |
| EPDM | MMA, Lauryl MA | 65 | 100% |
| Chloroprene | MMA, 2-EHMA, Iso-BMA | 93 | 50% |
| Chloroprene | MMA, 2-EHMA | 87 | 80% |
| Chloroprene | MMA, Iso-BMA | 97 | 100% |
| Chloroprene | MMA, Hexyl MA | 104 | 97% |
| Chloroprene | MMA, Octyl MA | 100 | 100% |
| Chloroprene | MMA, Lauryl MA | 98 | 94% |

The following table provides the result of peel tests of a THFMA-based adhesive formulation according to an embodiment of the present invention with variation in accompanying monomers.

| Rubber Type | Monomer mix | Maximum Peel Force (lbs) | % R-R |
|---|---|---|---|
| Natural Rubber | THFMA | 64 | 22% |
| Natural Rubber | THFMA, 2-EHMA | 45 | 50% |
| Natural Rubber | THFMA, Iso-BMA | 55 | 60% |
| Natural Rubber | THFMA, Iso-BMA, 2-EHMA | 68 | 90% |
| EPDM | THFMA | 68 | 100% |
| EPDM | THFMA, 2-EHMA | 70 | 100% |
| EPDM | THFMA, Iso-BMA | 73 | 100% |
| EPDM | THFMA, Iso-BMA, 2-EHMA | 71 | 100% |
| Chloroprene | THFMA | 81 | 67% |
| Chloroprene | THFMA, 2-EHMA | 94 | 100% |
| Chloroprene | THFMA, Iso-BMA | 100 | 100% |
| Chloroprene | THFMA, Iso-BMA, 2-EHMA | 93 | 100% |

In a further example, a non-peroxide based initiation system was demonstrated to be effective in conjuction with an embodiment of the present invention. A two part adhesive based on a borane-amine complex was prepared as follows:

A-Side:

| Functional Role | Component | Weight Percent |
|---|---|---|
| Primary Acrylic Monomer | Tetrahydrofurfuryl Methacrylate (THFMA) | 53 |
| Reactive Flexibilizing Monomer | 2-Ethylhexyl methacrylate (2-EHMA) | 17 |
| Accelerator/activator | Mono-2-(methyacryloxyloxy) ethyl succinate | 6 |
| Toughener | Poly(styrene:acrylonitrile:butandiene) HPSEC, MW of 45,300 | 14 |
| Filler | Silica | 10 |
| | Total | 100 |

B-Side:

| Functional Role | Component | Weight Percent |
| --- | --- | --- |
| Carrier | Polypropylene glycol adipate) | 43 |
| Initiator | Hexamethylenediamine/triethylborane | 24 |
| Acid scavenger | Trimethylolpropanetris(2-methyl-1-aziridine propionate) | 27 |
| Filler | Silica | 6 |
| | Total | 100 |

This adhesive was applied and tested in accordance with the procedures outlined above on a variety of different rubber types:

| Rubber Type | Peel Force (lbs) | % R-R |
| --- | --- | --- |
| Natural Rubber | 57 | 77% |
| Natural Rubber (with IPA wipe) | 60 | 72% |
| EPDM | 67 | 67% |
| Chloroprene | 48 | 0% |

The following examples demonstrate the heat aging and environmental resistance of adhesives of certain embodiments of the present invention. In these examples, the adhesives were prepared and applied to the substrates as indicated. After the aging/environmental conditions were applied, the samples were pulled at 2.0 in/min at an angle of 90 or 180 degrees as noted above. The maximum value of force was recorded as the value of strength (pli) and the amount of rubber retention (% R-R) was recorded as percentage of the disbonded 1×1 inch area.

A-Side:

| Functional Role | Component | Weight Percent |
| --- | --- | --- |
| Acrylate Monomer | THFMA | 36 |
| Acrylate Monomer | MMA | 3.0 |
| Reactive Flexibilizing Monomer | 2-EHMA | 12 |
| Substrate Dependent Monomer | iso-BMA | 10 |
| Reducing Agent | DIIPT | 0.7 |
| Toughener | (various) | 25 |
| Additives | (various) | 13 |
| | Total | 100 |

B Side:

| Functional Role | Component | Weight Percent |
| --- | --- | --- |
| Epoxy | Bis-A epoxy resin | 46.6 |
| Initiator | 57% di-BPO in surfactant | 48 |
| Pigment | Titanium dioxide | 3.0 |
| Thickener | Fumed silica | 2.4 |
| | Total | 100 |

In this example, a polychloroprene elastomer was bonded using the adhesive described above to either another polychloroprene elastomer or a grit-blasted cold rolled steel coupon. The sample was exposed to the listed conditions and tested to determine peel strength and rubber retention:

Heat Aging Conditions of 100° C. for 24 and 48 Hours. (Rubber-to-metal)

| Time 110 C. (hours) | Peel (pli) | % R-R |
| --- | --- | --- |
| 0 | 89.4 | 100 |
| 24 | 98.7 | 100 |
| 48 | 107 | 100 |

10%, Brine Soaking at 100° C. (Rubber-to-rubber Bonding)

| Time 100 C. (days) | Peel (pli) | % R-R |
| --- | --- | --- |
| 0 | 74.6 | 100 |
| 3 | 81.0 | 100 |
| 7 | 79.8 | 100 |

Thermal Cycling at −40° C. to 110° C. (42 Cycles in 7 Days) (Rubber-to-metal Bonding)

| Time (weeks) | Peel (pli) | % R-R |
| --- | --- | --- |
| 0 | 89.4 | 100 |
| 1 | 96.6 | 100 |

High Humidity Treatment (14 Days at 85% RH and 85° C.) (Rubber-to-metal Bonding)

| Time (weeks) | Peel (pli) | % R-R |
| --- | --- | --- |
| 0 | 89.4 | 100 |
| 2 | 100 | 100 |

In this example, a polychloroprene elastomer was bonded using the adhesive described above to either another polychloroprene elastomer or a grit-blasted cold rolled steel coupon. The sample was exposed to the listed conditions and tested to determine peel strength and rubber retention:

Chemical Resistance for 7 days (Rubber-to-rubber)

| Chemical Test | Sample | Peel (pli) | % R-R |
| --- | --- | --- | --- |
| 10% Brine at 100° C. | 1 | 57.9 | 80 |
| | 2 | 67.8 | 90 |
| | 3 | 73.1 | 90 |
| 85% Phosphoric Acid at 100° C. | 1 | 97.5 | 100 |
| | 2 | 72.1 | 100 |
| | 3 | 72.2 | 100 |
| 60% Sulfuric Acid at 52° C. | 1 | 100 | 100 |
| | 2 | 103 | 90 |
| | 3 | 70.3 | 100* |
| 37% HCl at 52° C. | 1 | 136 | 90 |
| | 2 | 150 | 100 |
| | 3 | 121 | 90 |
| 15% Bleach (NaClO) at 52° C. | 1 | 102 | 90 |
| | 2 | 90.8 | 100 |
| | 3 | 75.8 | 90 |

*This sample experienced "stock break" which indicates a potential issue or defect with the rubber sample.

The invention claimed is:

1. A method of bonding a vulcanized elastomer comprising the steps of:
   a) providing an adhesive comprising two parts, wherein the first part comprises:
      30 to 60 weight percent primary acrylate monomer comprising at least one of methyl methacrylate or tetrahydrofurfuryl methacrylate, 5 to 15 weight percent reactive flexibilizing monomer comprising at least one of 2-ethylhexyl methacrylate, hexyl methacrylate, or octyl methacrylate,
5 to 15 weight percent of a substrate dependent reactive monomer comprising iso-butyl methacrylate,
10 to 30 weight percent of a toughener,
0.5 to 5 weight percent of a reducing agent,
and the second part comprises:
30 to 60 weight percent of an epoxy resin, and
20 to 40 weight percent of an organic peroxide;
b) depositing the adhesive on at least one surface of an elastomer or a second substrate, wherein the elastomer is a vulcanized elastomer;
c) bringing the elastomer and second substrate together with the adhesive disposed therebetween; and,
d) allowing the adhesive to cure and bond the elastomer and second substrate together at a temperature of less than about 100° C. to produce a bonded structure.

2. The method of claim 1, wherein step d) is performed at a temperature of less than about 50° C.

3. The method of claim 1, wherein the second substrate comprises at least one of an elastomer substrate, a thermoplastic substrate, or a metallic substrate.

4. The method of claim 1, wherein the toughener comprises at least one of poly(styrene:butadiene:styrene), poly(styrene:acrylonitrile:butadiene), or styrene:isoprene:styrene.

5. The method of claim 1, wherein the adhesive is free of halogenated compounds, isocyanate compounds, or solvents.

6. The method of claim 1, wherein the 2-part adhesive is mixed immediately prior to the step of depositing the adhesive.

7. The method of claim 1, wherein there is no elastomer chlorination step.

8. The method of claim 1, wherein there is no metal degreasing step.

9. The method of claim 1, where the adhesive comprises the sole chemical composition applied to either the elastomer or second substrate prior to bonding, and the elastomer and second substrate are absent any metal primer, tack coating, or elastomer pre-treatment.

10. The method of claim 1, wherein the cured adhesive has an adhesion as measured by pull value of greater than 25pli as measured by ASTM D429 Method D at a peel rate of 2.0in/min.

11. The method of claim 1, wherein the adhesive is deposited by providing the first part on one of the elastomer or second substrate and providing the second part on the other of the elastomer or second substrate, and wherein when the elastomer and second substrate are brought together an initiator cures the acrylate monomer.

* * * * *